US008261086B2

United States Patent
Li et al.

(10) Patent No.: US 8,261,086 B2
(45) Date of Patent: Sep. 4, 2012

(54) COMPUTER AND METHOD FOR SENDING SECURITY INFORMATION FOR AUTHENTICATION

(75) Inventors: Zhigang Li, Beijing (CN); Min Hu, Beijing (CN); Rongfeng Feng, Beijing (CN); Yi Zhang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 938 days.

(21) Appl. No.: 12/315,979

(22) Filed: Dec. 9, 2008

(65) Prior Publication Data

US 2009/0150678 A1    Jun. 11, 2009

(30) Foreign Application Priority Data

Dec. 10, 2007    (CN) .......................... 2007 1 0179070

(51) Int. Cl.
     *G06F 21/00*      (2006.01)
(52) U.S. Cl. ............................ 713/183; 713/184; 726/27
(58) Field of Classification Search .................. None
     See application file for complete search history.

(56) References Cited

U.S. PATENT DOCUMENTS

| | | | | |
|---|---|---|---|---|
| 2003/0221115 | A1* | 11/2003 | Itoh et al. | 713/189 |
| 2004/0064668 | A1* | 4/2004 | Kjos et al. | 711/202 |
| 2007/0106986 | A1* | 5/2007 | Worley, Jr. | 718/1 |

* cited by examiner

*Primary Examiner* — Kaveh Abrishamkar
(74) *Attorney, Agent, or Firm* — Kinney & Lange, P.A.

(57) ABSTRACT

The present invention provides a computer and a method of sending security information for authentication, which relate to transmission of data information in computers. The present invention solves the vulnerability of information when a user conducts network transaction activities by a terminal. The computer of the present invention comprises: a virtual system platform; a first guest operating system installed on the virtual system platform, which is for installing a service application module, wherein the service application module generates a security information input interface when it is being executed; a second guest operating system installed on the virtual system platform; the second guest operating system comprises: a dynamic password generation module for generating security information, the security information is input into the security information input interface and is sent to a network server for authentication. The security of network activities conducted by users can be enhanced.

10 Claims, 5 Drawing Sheets

COMPUTER AND METHOD FOR SENDING SECURITY INFORMATION FOR AUTHENTICATION

BACKGROUND OF THE INVENTION

1. Field of Invention

The present invention relates to transmission of data information in computers, and in particularly, to a computer and a method for sending security information for authentication.

2. Description of Prior Art

There are more and more business activities occurring on network with the rapid development of Internet applications, such as online-bank, security transactions, instant message tools in user computers (for example, MSN, OICQ, etc.), online games, emails and applications of clients logging on LAN servers. The information security requirements used in these activities are increasing. There are some ways in conventional network activities by which a LAN server can be logged on:

A first way is a static password, in which private security information such as username and password is input by users through a keyboard at a client. The username and password input by users are authenticated at a network server, so as to be determined whether transactions can be made or not. The disadvantage of this way is that the username and password are prone to being guessed by others, or they can be intercepted by Trojans implanted in users' clients with keyboard hook or filtering driving techniques.

A second way is a conventional dynamic password, in which a password is generated according to a certain encryption algorithm. This password varies ceaselessly and non-repeatedly as a function of a varying parameter (for example, time or an event). In particular, this type of password includes: a dynamic papery password card, an electrical dynamic password card, and a phone's short message password. The disadvantage of this way is that the password is prone to being attacked by an intermediator, and is only authenticated in one direction, that is, clients are authenticated by servers.

A third way is a combination of a password and a certificate, in which public keys and Certificate Authority (CA) authentication are employed between clients and network servers. The certificate of a user is generally saved on a harddisk of a local computer, and the certificate (as well as private key) generally uses password protection. The passwords for logging on and private keys protected passwords as well as certificates may be intercepted by Trojans implanted in user clients.

There are many cases in which users' money is stolen during a process of online-bank or security transactions conducted in accordance with above ways.

A fourth way is a USB KEY and a mobile certificate, in which the certificate of a user is placed into a protection of the USB KEY hardware. This way is relatively safe. However, multiple USB KEYs will be used during processes of a plurality of online-bank applications or security transactions conducted by the user, which is inconvenient and costly.

A fifth way is Trust Platform Module (TPM). TPM is a type of security chip, which is capable of using resources of a computer platform and running independent of operating system. Programs embodied in the chip also ensure the security of TPM chip itself. The most important advantage of TPM chip is that data and keys can be stored and encrypted by hardware algorithms. As to TPM itself, however, it must operate together with software so as to work well, which results in a high cost. A plurality of online-bank applications may be implemented safely by using TPM, but the data protection of TPM is still by means of a static password and the approach is also similar to that of USB KEY.

SUMMARY OF THE INVENTION

Embodiments of the present invention provide a computer of improved security and a method of sending security information for authentication.

In order to solve above problems, an aspect of the present invention provides a computer, which comprises:
a virtual system platform;
a first guest operating system installed on the virtual system platform, which is for installing a service application module, wherein the service application module generates a security information input interface when it is being executed;
a second guest operating system installed on the virtual system platform, which comprises:
    a dynamic password generation module for generating security information, wherein the security information is input into the security information input interface and is sent to a network server for authentication.

Preferably, the virtual system platform comprises a hardware platform and a virtual machine monitor installed on the hardware platform.

Preferably, the first guest operating system comprises a dynamic password enabling module for launching or stopping the dynamic password generation module on the second guest operating system by means of the virtual machine monitor.

Preferably, the security information generated by the dynamic password generation module comprises password information and/or password authentication code information.

Preferably, the dynamic password generation module generates the security information by use of a HASH algorithm.

Another aspect of the present invention provides a method of sending security information for authentication, which comprises:
the security information is generated dynamically in a second guest operating system;
a security information input interface corresponding to a service application module is generated in a first guest operating system;
the security information is input into the security information input interface;
the security information is sent to a network server for authentication.

Preferably, the security information comprises password information and/or password authentication code information.

Preferably, the method further comprises a step of authenticating carried out by the network server for authentication, wherein the server generates password information by use of the same algorithm as that by which the security information is generated dynamically in the second guest operating system, and compares the password information with the received password information; the authentication is passed, if the two pieces of password information are consistent with each other; otherwise, the authentication fails.

Preferably, the method further comprises a step of authenticating an identity of the server, after the authentication carried out at the network server for authentication is passed, wherein the server generates server identity password information by use of the same algorithm as that by which the security information is generated dynamically in the second guest operating system;

the server identity password information is sent to the security information input interface of the first guest operating system;

server identity password information is generated dynamically by use of the same algorithm in the second guest operating system as that used by the server, and is compared with the one received from the security information input interface; the identity of the server is correct, if the two pieces of server identity password information are consistent with each other; otherwise, the identity of the server is not correct.

Preferably, the security information is generated dynamically in the second guest operating system by use of a HASH algorithm.

The solutions described above employ a virtual system platform to set up a plurality of guest operating systems, so that when the user is logging on the network server for authentication, the first guest operating system, which provides the service application module for the user, may be isolated with the second guest operating system which generates security information such as the password information and the password authentication code. Thus, the risk of being stolen by Trojans in the user's client and attacks by the intermediator on the network can be avoided. That is, the security information of the client can be isolated from the network, which ensures the security of network-logging on by the user. Aforesaid solutions also employ such a scheme that both the client and the server use a dynamic password. In principle, it is secure to use a dynamic password for one time password (OTP). Additionally, interaction between the client and the server may also be achieved, in particular, a bidirectional authentication between the client and the server may be achieved, which enhances the securities of network activities made by users.

BRIEF DESCRIPTION OF THE DRAWINGS

The embodiments of the present invention are described below with reference to the drawings, in which.

DETAILED DESCRIPTION OF EMBODIMENTS

Figure 1:
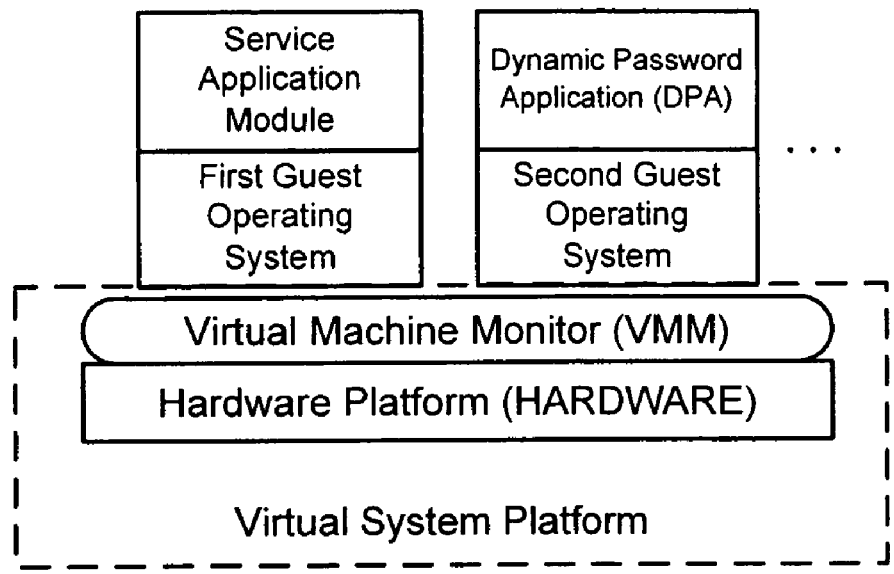
FIG. 1 is a block diagram of a computer according to embodiments of the present invention.

Hereinafter, the present invention will be further described in detail by referring to the drawings and the embodiments in order to make the objects, technical scheme and advantages of the present invention more apparent.

Embodiments of present invention aim at solving a problem in which information security is vulnerable when users conduct online transactions by clients, and provide a computer with improved security. Now, the computer according to the embodiments of present invention will be elaborated with reference to the drawings.

As shown in FIG. 1, the computer mostly comprises a virtual system platform as well as a first guest operating system (Guest OS 1) and a second guest operating system (Guest OS 2) installed on the virtual system platform, wherein there may be one or more Guest OS 1s and also one or more Guest OS 2s. There is a service application module installed on the Guest OS 1. When being executed, the service application module may create a security information input interface. The user accomplishes various service applications (such as logging on a network server, and transactions) through the Guest OS 1 which may be WindowsXP, VISTA. There is a dynamic password generation (DPA) module installed on the Guest OS 2 (for example, open source Linux). The DPA module is for generating security information which is input by the security information input interface and sent to a server for authentication on the network.

In the above-mentioned computer, the virtual system platform includes a hardware platform (Hardware) and a virtual machine monitor (VMM) installed on the hardware platform. The VMM manages a plurality of Guest OSs installed on a single computer. These Guest OSs do not interfere with each other, and application programs may run separately on the mutually isolated OSs.

In particular, the aforesaid Guest OS 1 includes: a dynamic password enabling module, which may be implemented by a dynamic password enabling program. The program is running on the Guest OS 1, and launches a dynamic password generation module installed on Guest OS 2 by means of the VMM. In the Guest OS 1, the user can exit the dynamic password enabling program. Then, the Guest OS 1 may close the dynamic password generation module installed on Guest OS 2 by means of the VMM. The dynamic password generation module is running on the Guest OS 2 which comprises a user interface (UI), on which the dynamic password generation module as well as other service applications in the Guest OS 1 may be displayed simultaneously. Therefore, when used by the user, it seems that they were one application in the Guest OS 1.

Security information generated by the dynamic password generation module includes password information and/or password authentication code information. The password information comprises a log-on password, and an identity password, and the password authentication code information comprises authentication code information used in the process of network activities of the user. In particular, the password information and/or password authentication code information can be generated by a HASH algorithm. Of course, the password information and/or password authentication code information can be generated by other algorithms.

The application of the above-mentioned computer will be further described by the following embodiments.

A First Embodiment

Users Log On an Online-Bank

A computer shown in FIG. 1 is firstly constructed. Then, a bank background program with the same algorithm as used by the dynamic password generation module (DPA) runs on an online-bank server. Before using the online-bank application, the user inputs a username and original password information into the interface of the DPA, and an online-bank certificate is loaded by the Guest OS 2.

1. A Password for Logging On a Bank Server Is Generated Dynamically By the DPA.

A password for logging on the bank server is generated dynamically by the DPA with the HASH operation of the username and the original password input by the user, and time of the server or the client (random number 1). This generated password is called as a dynamic log-on password since it changes dynamically, that is, dynamic log-on password=HASH (username, original password, random number 1), wherein, the parameters involved in the HASH operation, i.e. username, original password and random number 1, can be expressed by ASCII code if they are letters or special characters or numbers; or they can be expressed by other coding schemes if they are Chinese characters or characters of other languages, such as 4-byte Internal Statement Number (ISN). In principle, the particular coding scheme may employ any coding method, so long as the client and server have the same coding method.

The random number 1 is the time of the server or the client, and there may be an error therebetween sometimes. There are two solutions in order to avoid this error: one is that the server provides a Universal Time Coordinated (UTC) standard time and adjusts time of the client; and the other is that the server permits an error existed in the client, and when the authentication is executed, for example, for all the possible passwords having a time error between ±3 minutes, the authentication will be passed if one of them is correct, and a prompt is provided for the user to modify the time.

After the generation of a dynamic log-on password by the DPA, the dynamic log-on password is input by the user into an interface for logging on the online-bank application which is running on the Guest OS 1, and sent to the server. Then, the server generates a dynamic log-on password by using the same algorithm as that of the DPA, and compares both of the passwords. If they are consistent with each other, the authentication will be passed and it is permitted to log on the server of the online-bank. Otherwise, the logging on is denied.

2. The Client Authenticates the Server of the Online-Bank.

The server generates an online-bank identity dynamic password by using an algorithm which is the same as used in the DPA module. The password is generated after a HASH operation of a certificate of the online-bank, a username and a random number 2 (for example, time) and changes dynamically, that is, online-bank identity dynamic password=HASH (certificate of the online-bank, account of the online-bank, random number 2)

The online-bank identity dynamic password generated at the server may be sent to an online-bank interface of the Guest OS 1 running on the client. At the client, the VMM launches the DPA application of the Guest OS 2 by means of the dynamic password enabling module, and then inputs its online-bank account and the online-bank dynamic password generated at the server on the interface of the DPA. In addition, the certificate of the online-bank and absolute time information are filled automatically by the DPA application. Now, the DPA internally generates an online-bank identity dynamic password by using the same HASH algorithm as that at the server. Then, the DPA compares its generated online-bank server identity dynamic password with the one generated at the server. If both are consistent with each other, the identity of the online-bank server is correct and transactions can be made by users. Otherwise, the user is not allowed to log on the server.

Authenticity of an online-bank server may be determined by the authentication of the server performed at the client. A bidirectional authentication between the client and the server may be implemented by the authentication with the client by the server and the authentication with the server by the client when the client is logging on the server, as discussed above. Therefore, the securities of service applications are further enhanced.

3. A Transaction Dynamic Authentication Code

When the user logs on the online-bank, a secure link is established by means of SSL (Secure Sockets Layer, which is a protocol between TCP/IP, protocol and various application layer protocols and supports a secure data communication). Then, information such as a sum of transaction, a transfer account, a serial number. will be generated during the process of transaction. The information is prompted to users by the online-bank server. Transaction dynamic authentication codes (i.e. data MAC codes) are generated at both the DPA and background program of the online-bank server by use of the information, that is, MAC=HASH_KEY (dynamic password, date of transaction∥serial number∥sum of transaction∥transfer account), wherein, HASH_KEY is a HASH operation with keys, the dynamic password is current dynamic password which is generated by the same algorithm as that by which the log-on password is generated, "∥" denotes a serial concatenation of related information as a HASH plaintext.

The user switches to an interactive interface of related functions of the DPA and fills a serial number, a sum of transaction, a transfer account, wherein the date is filled automatically by the DPA. The DPA computes a MAC number for the user, and fills the MAC number into a transaction interface of the Guest OS 1. After being confirmed, this MAC number is sent to the server. The server verifies the MAC number, i.e. comparing the MAC generated by itself with the one generated by the client. The occurred transaction will be accepted by the online-bank server only if both of the MAC numbers are consistent with each other. The method of this embodiment also applies to other online transaction systems, such as security transaction.

The advantages of this embodiment are listed as follows:

1. If the user logs on a phishing website, an online-bank server identity dynamic password which is difficult to be fabricated is required to be produced by the online-bank server. Therefore, the user can identify the identity of the website by means of the authentication of the online-bank identity dynamic password performed by the DPA application.

2. If a Trojan is implanted into the client, it is possible that the Trojan have stolen the password input by the user or a certificate. However, it will not affect subsequent passwords since the password input by the user is only the current password.

3. There are many intermediator attacks during the process of network communication: a secure SSL link is established between the user and the online-bank server with a SSL technique which is widely used by an IE explorer, and the communication plaintext can not be intercepted by the intermediator.

4. Replay attacks: a dynamic password is associated with a timestamp during a process from logging on the server to the completion of transaction, which avoids the replay attacks.

5. Attacks before SSL encryption of a client: it is a problem which is difficult to be handled by prior art. The precondition of this attacking is that the hacker is capable of controlling the host; knows aforesaid information, such as a dynamic password, a date of transaction, a serial number, a sum of transaction, and a transfer account; and juggles transaction data during the transaction. However, the only way to steal money is to modify the above-mentioned data (for example, the account) and to recalculate a MAC code. Therefore, the hacker can not calculate a correct MAC and cannot steal money, since the method for calculating the MAC code is isolated in another operating system thoroughly.

A Second Embodiment

A Client Logs On the Server for Authentication Via LAN

In applications in which the client from the LAN logs on the server, it is required to input a network account including a username, a domain name and a password into a security information input interface of the client.

1. A Log-on Password for a Client

Similar to the generation of a password for logging on a bank server, a password for logging on a server is generated after a HASH operation of a username, a domain name for logging on, a user original password, and time of the client (a random number) is executed by the DPA, that is, dynamic log-on password=HASH (username, domain name for logging on, original password, random number), wherein the problem of a time error between the client and the server is solved by the method described in the first embodiment.

2. The Server Authenticates the Client

A background program which uses the same algorithm as that of the DPA is running on the server, and executes the same algorithm for generating a dynamic password. The server calculates the dynamic log-on password according to the same method, since the server has known the username, the domain name for logging on, the user original password information, and the random number is known by both the client and the server, during an initialization phase of setting up the user account. Therefore, the server compares the dynamic log-on password calculated by itself with the one sent by the client. If both are the same, the client is allowed to log on the server. Otherwise, the logging on is denied.

The Third Embodiment

A Client Logs on a Mailbox Server To Use an Email Box Via Internet

1. A log-on Password for a Client

Similar to the generation of a password for logging on a bank server, a password for logging on an mailbox server is generated after a HASH operation of a username, an website address for logging on, and time of the client (a random number) is executed by the DPA, that is, dynamic log-on password=HASH (username, website address for logging on, original password, random number), wherein the problem of a time error between the client and the server is solved by the method described in the first embodiment.

2. The Mailbox Server Authenticates the Client

A background program which uses the same algorithm as that of the DPA is running on the mailbox server, and executes the same algorithm for generating a dynamic password. The mailbox server calculates the dynamic log-on password according to the same method, since the server has known the username and the user original password information, and the website address for logging on and the random number are known by both the client and the server, during an initialization process of applying for an address of email. Therefore, the mailbox server compares the dynamic log-on password calculated by itself with the one sent by the client. If both are the same, the client is allowed to log on the mailbox server. Otherwise, the logging on is denied.

The Fourth Embodiment

A Client Logs On a MSN Server Via Internet

1. A Password for a Client Logging On a MSN Server

Similar to the generation of a password for logging on a bank server, a password for logging on a MSN server is generated after a HASH operation of a username, a user original password, and time of the client (a random number) is executed by DPA, that is, dynamic log-on password=HASH (username, original password, random number), wherein the problem of a time error between the client and the server is solved by the method described in the first embodiment.

2. The MSN Server Authenticates the Client

A background program which uses the same algorithm as that of the DPA is running on the MSN server, and executes the same algorithm for generating a dynamic password. The MSN server calculates the dynamic log-on password according to the same method, since the server has known the username and the user original password information, and the random number is known by both the client and the server, during an initialization phase of applying for a MSN. Therefore, the MSN server compares the dynamic log-on password calculated by itself with the one sent by the client. If both are the same, the client is allowed to log on the MSN server. Otherwise, the logging on is denied. The method used in this embodiment is also applicable to other scenes in which the client logs on another type of server (for example, a QQ server).

Above embodiments are based on the following facts: at least one guest operating systems are established on the virtual system platform of the computer; when a user is logging on a network server, the Guest OS 1, which provides service applications, and the Guest OS 2, which generates a dynamic password and an authentication code, are isolated with each other. Therefore, the risk of being stolen by Trojans in the user's client and attacks by the intermediator on the network may be avoided. That is, the security information of the client can be isolated from network, which ensures the security of network logging on. Aforesaid embodiments also employ such a scheme that both the client and the server use a dynamic password. In principle, it is more secure to use a dynamic password for OTP. Additionally, interaction between the client and the server may also be achieved. In particular, a bidirectional authentication between a client and a server may be achieved, which enhances the securities of network activities made by users.

The schemes of above embodiments comprise: a computer and means for generating a dynamic password are combined together on a virtual system platform. Both of them use the same display, keyboard, memory device and harddisk. That is, the computer simulates or adds a virtual device DPA from functions of itself. The virtual device is functionally isolated with original functions of the computer (i.e. data can not be read from each other), instead of being separated physically. Compared to means for generating a dynamic password in prior art which can be used separately and power-supplied individually, the cost is reduced, and the convenience and security are enhanced.

Figure 2:
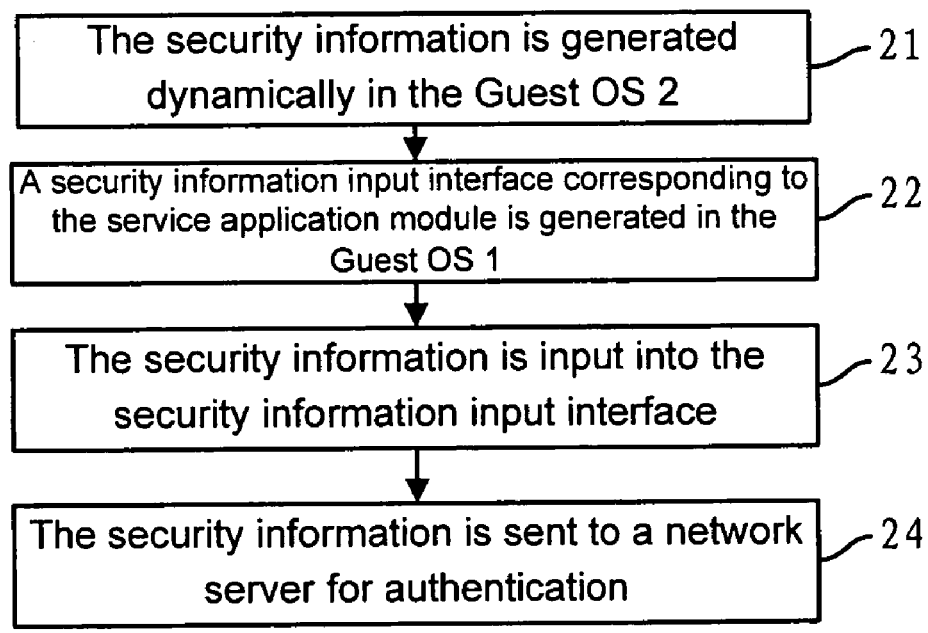
FIG. 2 is a flow chart of sending security information for authentication according to embodiments of the present invention.

As shown in FIG. 2, the embodiment of present invention also provides a method of sending security information for authentication, comprising:

step 21: the security information is generated dynamically in the Guest OS 2;

step 22: a security information input interface corresponding to a service application module is generated in the Guest OS 1;

step 23: the security information is input into the security information input interface; and step 24: the security information is sent to the network server for authentication.

In step 21, the dynamically generated security information comprises password information and/or password authentication code information. The password information comprises a log-on password, and an identity password. The password authentication code information comprises authentication code information used when a user is conducting network activities.

Figure 2A:
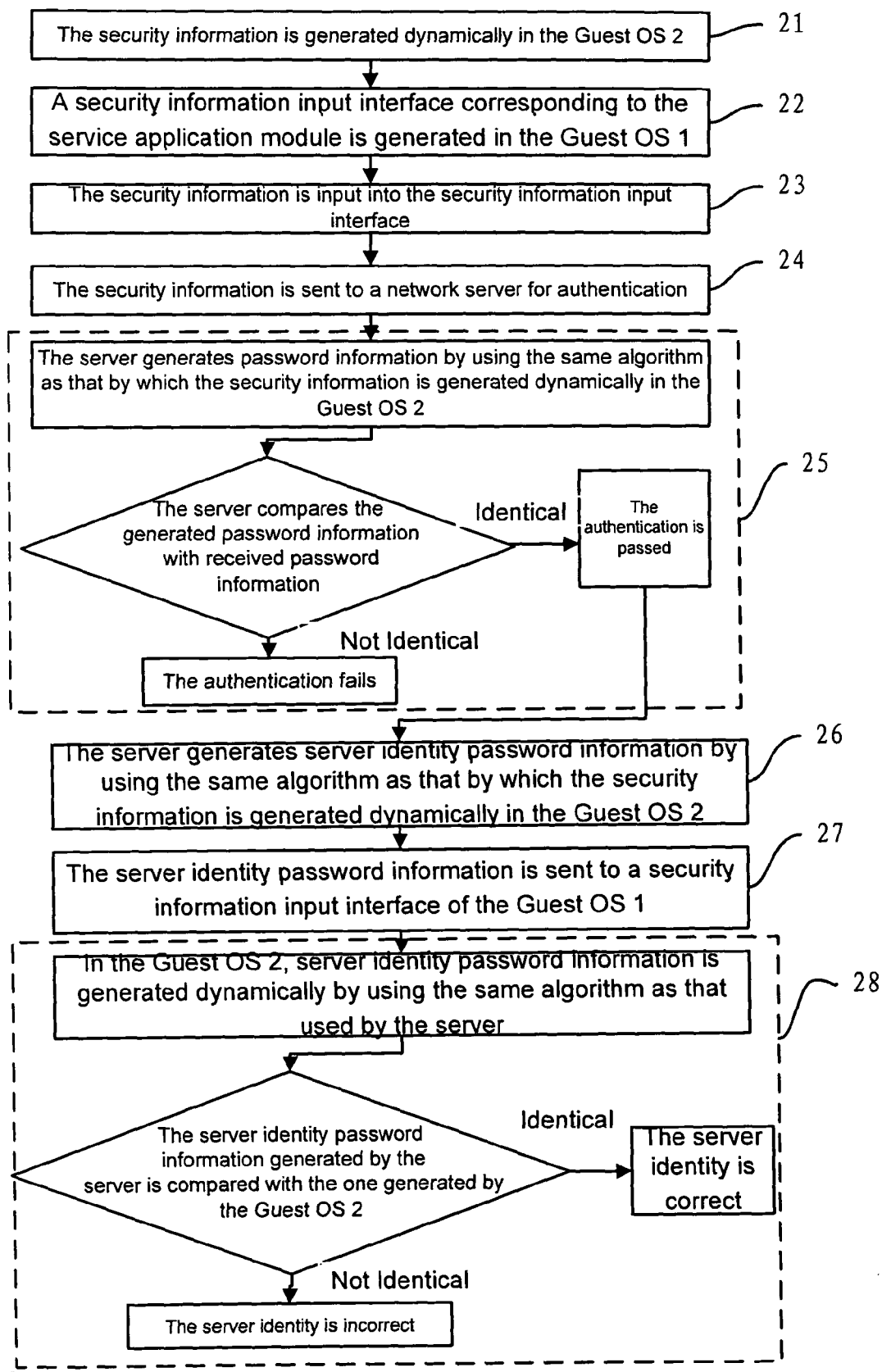
FIG. 2A is another detailed flow chart of sending security information for authentication according to embodiments of the present invention.

As shown in FIG. 2A, the method further includes steps for authentication carried out at the network server:

step 25: the server generates password information by using the same algorithm as that by which the security information is generated dynamically in the Guest OS 2 (for example, HASH or other algorithms). Then, the server compares it with the received password information. If they are consistent with each other, the authentication is passed. Otherwise, the authentication fails.

By means of above steps, an authentication of the client made by the network server is achieved in a virtual environment.

After the authentication made by the network server for authentication is passed, the method further comprises steps for authenticating an identity of the server:

step 26: the server generates server identity password information by using the same algorithm as that by which the security information is generated dynamically in the Guest OS 2 (for example, HASH or other algorithms);

step 27: the server identity password information is sent to a security information input interface of the Guest OS 1;

step 28: in the Guest OS 2, server identity password information is generated dynamically by using the same algorithm as that used by the server. This information is compared with the one received from the security information in put interface. If they are consistent with each other, the server identity is correct and the user can conduct transactions. Otherwise, the server identity is incorrect and the user is refused to log on the server.

Above steps can determine whether an identity of a network server is correct by authenticating the network server or not. If the identity is not correct, it indicates that the server is a fake one, and subsequent service activities cannot be conducted. Therefore, the security of network service activities conducted by users is further enhanced.

Figure 3:
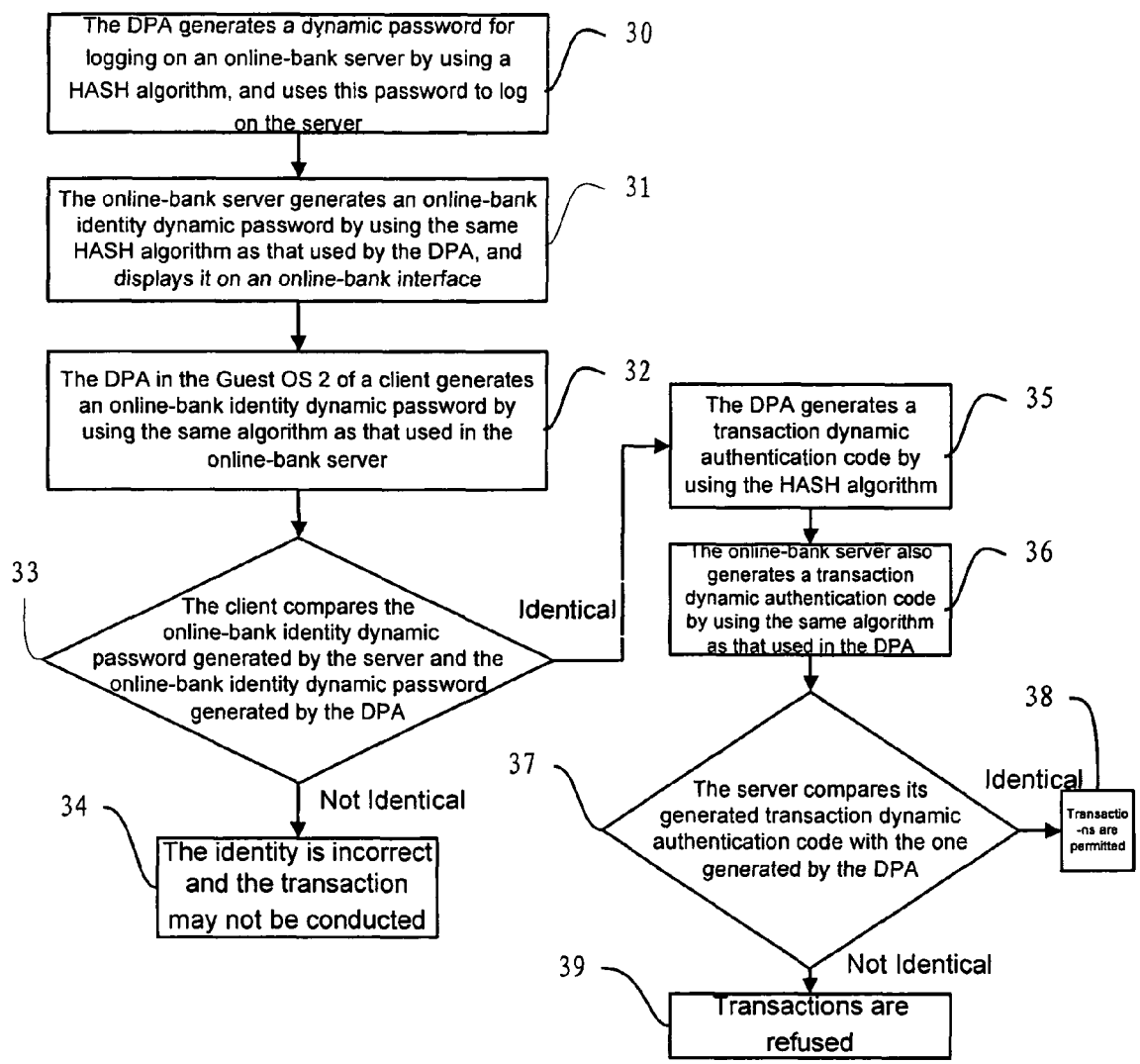
FIG. 3 is a flow chart of application of the method shown in FIG. 2 upon an online-bank system.

In the following, a particular application of aforesaid method of sending security information for authentication is described with reference to embodiments:

As shown in FIG. 3, an embodiment of a user logging on an online-bank is illustrated, comprising:

step 30: the DPA in the Guest OS 2 of a client generates a dynamic password for logging on an online-bank server by using a HASH algorithm. Then, the dynamic log-on password is input into an interface of the Guest OS 1 for logging on an online-bank, and is in turn sent to a network server for authentication. The sever generates a dynamic log-on password by using the same algorithm used by the DPA, and compares it with the received one. If they are consistent with each other, the authentication will be passed and subsequent transactions can be conducted. In addition, the HASH algorithm by which the dynamic log-on password is generated is identical to that used in the first embodiment;

step 31: the online-bank server generates an online-bank identity dynamic password by using the same HASH algorithm as that used by the DPA, and displays it on an online-bank interface. In addition, the HASH algorithm by which the online-bank identity dynamic password is generated is identical to that used in the first embodiment;

step 32: the DPA in the Guest OS 2 of a client generates an online-bank identity dynamic password by using the same algorithm as that used in the online-bank server;

step 33: the client compares the online-bank identity dynamic password generated by the server and the online-bank identity dynamic password generated by the DPA. If they are consistent with each other, the process goes to step 35. Otherwise, it goes to step 34;

step 34: the identity is incorrect and the transaction may not be conducted;

step 35. the DPA generates a transaction dynamic authentication code, i.e. a data MAC code, wherein the HASH algorithm by which the MAC code is generated is identical to that used in the first embodiment;

step 36: the online-bank server also generates a transaction dynamic authentication code by using the same algorithm as that used in the DPA;

step 37: the server compares its generated transaction dynamic authentication code with the one generated by the DPA. If they are consistent with each other, the process goes to step 39. Otherwise, it goes to step 38;

step 38: transactions are refused.

step 39: transactions are permitted.

The steps 31, 32, 33, and 34 (i.e. the client authenticates the server) are optional. It can be determined whether an identity of a network server is correct by authenticating the network server. If the identity is not correct, it indicates that the server is a fake one, and transactions may not be conducted by users. The steps 30, 31, 32, 33, and 34 realize a bidirectional authentication between the client and the server. Therefore, the security of network service activities is further enhanced. In addition, the method of this embodiment is also adapted to other online transaction system, for example, a security transaction system.

Figure 4:
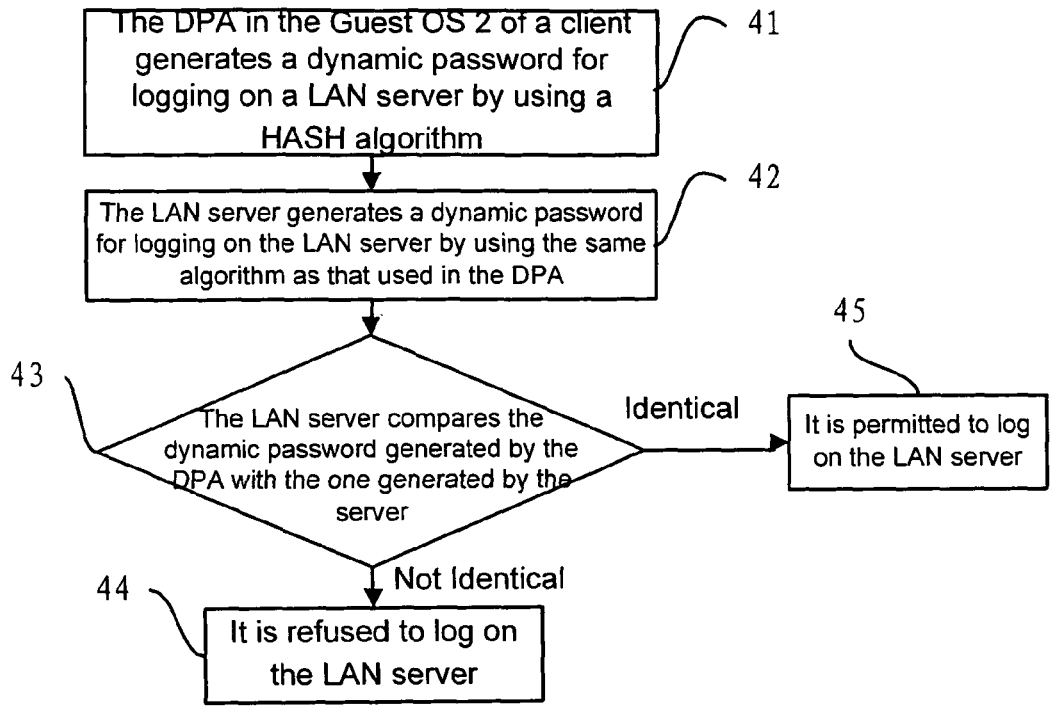
FIG. 4 is a flow chart of application of the method shown in FIG. 2 upon logging on a LAN server.

As shown in FIG. 4, an embodiment of a user logging on a server via LAN is illustrated, comprising:

step 41: the DPA in the Guest OS 2 of the client generates a dynamic password for logging on a LAN server by using a HASH algorithm. Then, the dynamic log-on password is input into a log-on interface of the Guest OS 1, and is in turn sent to a network LAN server. Similar to the generation of the password for logging on an online-bank server, a password for logging on a server is generated after a HASH operation of a username, a domain name for logging on, a user original password, and time of the client (a random number), that is, dynamic log-on password=HASH (username, domain name for logging on, original password, random number)

wherein the problem of a time error between the client and the server is solved by the method described in the first embodiment;

step 42: the LAN server generates a dynamic password for logging on the LAN server by using the same algorithm as that used in the DPA;

step 43: the LAN server compares the dynamic password generated by the DPA with the one generated by the server. If they are consistent with each other, the process goes to step 45. Otherwise, it goes to step 44;
step 44: it is refused to log on the LAN server;
step 45: it is permitted to log on the LAN server.

Figure 5:
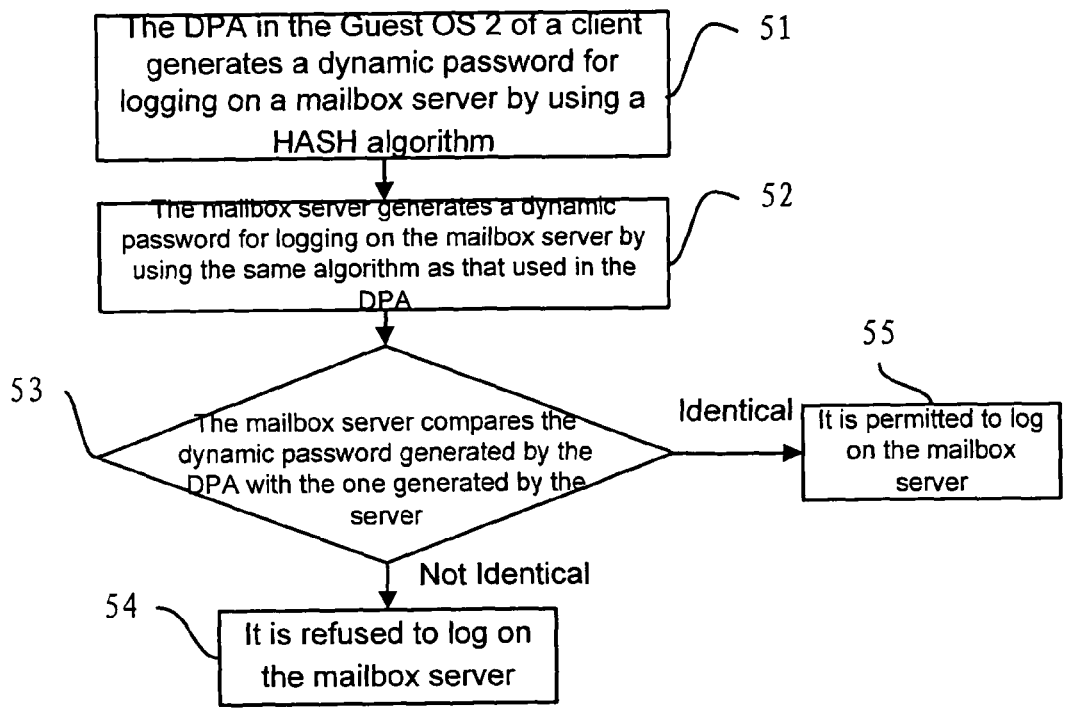
FIG. 5 is a flow chart of application of the method shown in FIG. 2 upon logging on a mailbox server.

As shown in FIG. 5, an embodiment of a user logging on an mailbox server via Internet is illustrated, comprising:
step 51: the DPA in the Guest OS 2 of a client generates a dynamic password for logging on an mailbox server by using a HASH algorithm. Then, the dynamic log-on password is input into a log-on interface of the Guest OS 1, and is in turn sent to a network mailbox server. Similar to the generation of the password for logging on the online-bank server, a password for logging on an mailbox server is generated after a HASH operation of a username, an website address for logging on, and time of the client (a random number), that is, dynamic log-on password=HASH (username, website address for logging on, original password, random number), wherein the problem of a time error between the client and the server is solved by the method described in the first embodiment;
step 52: the mailbox server generates a dynamic password for logging on the mailbox server by using the same algorithm as that used in the DPA;
step 53: the mailbox server compares the dynamic password generated by the DPA with the one generated by the server. If they are consistent with each other, the process goes to step 55. Otherwise, it goes to step 54;
step 54: it is refused to log on the mailbox server;
step 55: it is permitted to log on the mailbox server.

Figure 6:
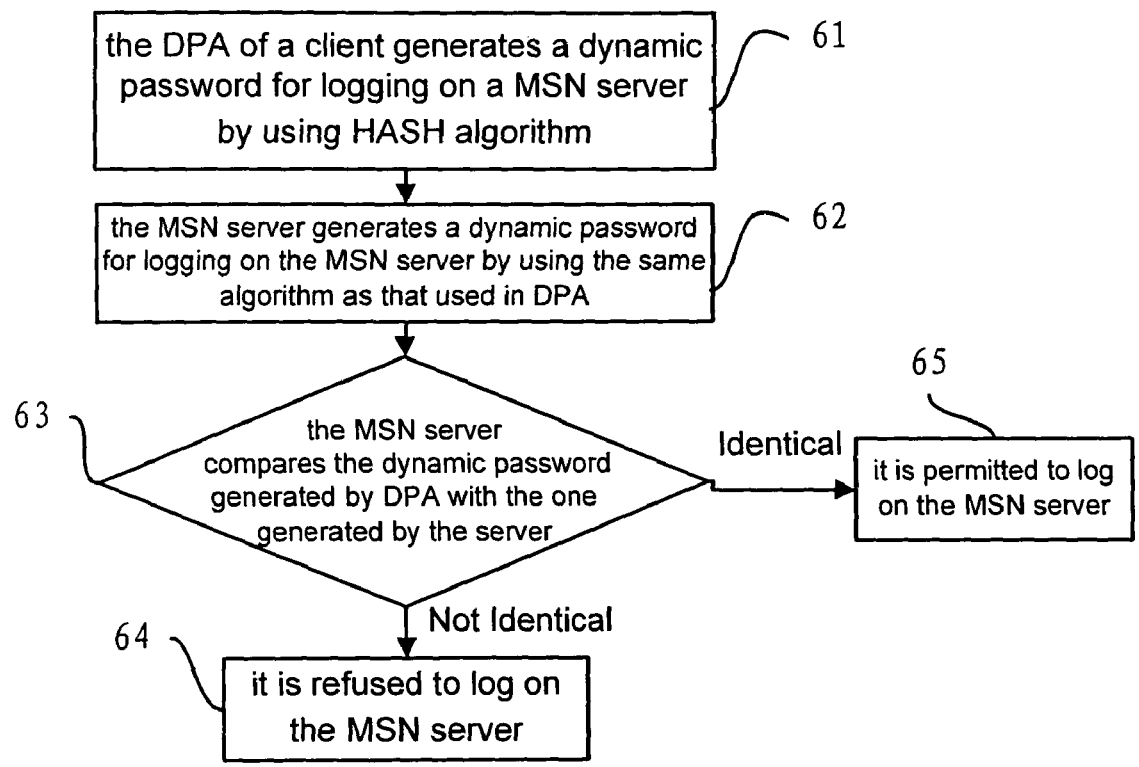
FIG. 6 is a flow chart of application of the method shown in FIG. 2 upon logging on a MSN server.

As shown in FIG. 6, an embodiment of a user logging on a MSN server via Internet is illustrated, comprising:
step 61: the DPA of a client generates a dynamic password for logging on a MSN server by using a HASH algorithm. Then, the dynamic log-on password is input into a log-on interface of the Guest OS 1 for logging on a MSN server, and is in turn sent to a network MSN server. Similar to the generation of the password for logging on the online-bank server, a password for logging on a MSN server is generated after a HASH operation of a username, an original password, and time of the client (a random number), that is, dynamic log-on password=HASH (username, original password, random number)

wherein the problem of a time error between the client and the server is solved by the method described in the first embodiment;
step 62: the MSN server generates a dynamic password for logging on the MSN server by using the same algorithm as that used in the DPA;
step 63: the MSN server compares the dynamic password generated by the DPA with the one generated by the server. If they are consistent with each other, the process goes to step 65. Otherwise, it goes to step 64;
step 64: it is refused to log on the MSN server.
step 65: it is permitted to log on the MSN server.

The method of this embodiment is also adapted to the scenes in which another instant message tool (for example, QQ) is logging on a server.

The embodiments described above employ a virtualization method to set up a plurality of guest operating systems on a virtual system platform of the client. These operating systems are managed by a virtual machine manager. When a user is logging on a network server, the Guest OS 1, which provides service applications, and the Guest OS 2, which generates a dynamic password and an authentication code, are isolated with each other. Thus, stolen by Trojans in the user's client and attacks by the intermediator on the network may be better avoided. That is, the security information of the client can be isolated from network, which ensures the security of network logging on. Aforesaid embodiments also employ such a scheme that both the client and the server use a dynamic password. In principle, it is safest to use a dynamic password for OTP. Additionally, interaction between the client and the server may also be achieved. In particular, a bidirectional authentication between a client and a server may be achieved, which enhances the securities of network activities made by users.

Although some embodiments of the present invention have been shown and described, it will be appreciated by those skilled in the art that many improvements and changes can be made without departing from the principles and spirits of the invention. The improvements and changes shall fall into the scope of the invention which is defined by the following claims.

What is claimed is:

1. A computer, comprising:
a virtual system platform;
a first guest operating system, run on the virtual system platform, comprising a service application module configured to generate a security information input interface when the service application module is executed; and
a second guest operating system, run on the virtual system platform, comprising
a dynamic password generation module configured to dynamically generate security information,
wherein the security information generated by the dynamic password generation module is input through the security information input interface generated by the service application module and is then sent to a network server for authentication.

2. The computer according to claim 1, wherein the virtual system platform comprises a hardware platform and a virtual machine monitor installed on the hardware platform.

3. The computer according to claim 2, wherein the first guest operating system comprises a dynamic password enabling module for launching or stopping the dynamic password generation module on the second guest operating system by means of the virtual machine monitor.

4. The computer according to claim 1, wherein the security information generated by the dynamic password generation module comprises password information and/or password authentication code information.

5. The computer according to claim 1, wherein the dynamic password generation module generates the security information by use of a HASH algorithm.

6. A method of sending security information for authentication, comprising the steps of:
dynamically generating the security information by a dynamic password generation module comprised in a second guest operating system run on a virtual system platform;
generating a security information input interface by a service application module comprised in a first guest operating system run on the virtual system platform;
inputting the security information generated by the dynamic password generation module through the security information input interface; and
sending the security information input through the security information input interface generated by the service application module to a network server for authentication.

7. The method of sending security information for authentication according to claim 6, wherein the security information comprises password information and/or password authentication code information.

8. The method of sending security information for authentication according to claim 7, further comprising a step of authenticating carried out by the network server for authentication, wherein the server generates password information by use of the same algorithm as that by which the security information is generated dynamically in the second guest operating system, and compares the password information with the received password information; the authentication is passed, if the two pieces of password information are consistent with each other; otherwise, the authentication fails.

9. The method of sending security information for authentication according to claim 8, comprises further comprising a step of authenticating an identity of the server after the authentication carried out at the network server for authentication is passed, wherein the server generates server identity password information by use of the same algorithm as that by which the security information is generated dynamically in the second guest operating system;

the server identity password information is input through a security information input interface of the first guest operating system;

server identity password information is generated dynamically by use of the same algorithm in the second guest operating system as that used by the server, and is compared with the one received from the security information input interface; the identity of the server is correct, if the two pieces of server identity password information are consistent with each other; otherwise, the identity of the server is not correct.

10. The method of sending security information for authentication according to claim 6, wherein the security information is generated dynamically in the second guest operating system by use of a HASH algorithm.

* * * * *

UNITED STATES PATENT AND TRADEMARK OFFICE
CERTIFICATE OF CORRECTION

PATENT NO.        : 8,261,086 B2                                           Page 1 of 1
APPLICATION NO.   : 12/315979
DATED             : September 4, 2012
INVENTOR(S)       : Zhigang Li et al.

It is certified that error appears in the above-identified patent and that said Letters Patent is hereby corrected as shown below:

In the Claims

Col. 13, Line 17, Claim 9,
  Delete "comprises" before "further comprising"

Signed and Sealed this
Sixth Day of January, 2015

Michelle K. Lee
*Deputy Director of the United States Patent and Trademark Office*